United States Patent [19]

Romanet

[11] Patent Number: 4,869,585
[45] Date of Patent: Sep. 26, 1989

[54] HINGE AND EYEGLASS FRAME COMPRISING SAME

[75] Inventor: Claude Romanet, La Varenne Saint Hilaire, France

[73] Assignee: Essilor International Cie Generale d'Optique, Creteil, France

[21] Appl. No.: 37,197

[22] Filed: Apr. 10, 1987

[30] Foreign Application Priority Data

Apr. 30, 1986 [FR] France ................ 86 06293

[51] Int. Cl.⁴ .............................................. G02C 5/22
[52] U.S. Cl. ...................................... 351/153; 351/41
[58] Field of Search .................... 351/153, 121, 41; 16/225, 226, 228

[56] References Cited

U.S. PATENT DOCUMENTS

| 3,110,057 | 11/1963 | Urich | 16/228 |
| 3,349,430 | 10/1967 | Rosenvold et al. | 2351/153 |
| 3,594,073 | 7/1971 | Liautaud | 251/153 |
| 3,941,461 | 3/1976 | Lambert | 351/95 |
| 4,178,081 | 12/1979 | Metcalfe | 351/153 |

FOREIGN PATENT DOCUMENTS

| 2363807 | 3/1978 | France . |
| 2394107 | 1/1979 | France . |
| 136619 | 9/1984 | Japan . |

Primary Examiner—Bruce Y. Arnold
Assistant Examiner—P. M. Dzierzynski
Attorney, Agent, or Firm—Charles E. Brown; Charles A. Brown

[57] ABSTRACT

A hinge comprises two parts and a pin by which these two parts are hinged together. An end portion of the pin is force fitted in an opening in one of the two parts. A head on the pin is in stressed axial bearing engagement with a bearing surface on one of the two parts. The hinge may be employed to articulate the lateral support temples to the front assembly of an eyeglass frame.

26 Claims, 2 Drawing Sheets

HINGE AND EYEGLASS FRAME COMPRISING SAME

BACKGROUND OF THE INVENTION

1. Field of the invention

The present invention is generally concerned with hinges and is more particularly but not necessarily exclusively directed to those designed to be fitted to eyeglass frames.

2. Description of the prior art

Taken as a whole, a hinge comprises two parts articulated to each other by a pin.

In an eyeglass frame a hinge of this kind is usually operative between the front assembly and each of the side support temples, for the purpose of folding the latter.

In practice, for each of these lateral support temples one of the component parts of the hinge employed is part of the front assembly, where it forms a yoke at the end of a tenon, for example, while the other forms part of the lateral support temple itself, where it forms a knuckle, for example, which is inserted between the two branches of the previously mentioned yoke, although the converse arrangement is equally possible.

One problem in providing hinges of this type resides in the fact that it is necessary to secure in some appropriate way the pin which forms the articulation axis.

To this end, in eyeglass frames the pin is usually a screw which has an appropriately threaded end portion which screws into a threaded opening in one of the branches of the yoke concerned and which has a head in axial bearing engagement with the other branch.

However, although various palliative measures of all kinds are routinely deployed to oppose this, it is not at all rare for a screw of this kind to become unscrewed in service and/or for wear of the parts concerned to occur, which in either case is detrimental to the retention of the corresponding lateral support temple.

A general object of the present invention is an arrangement which provides a simple and effective solution to the problem of retaining the pin of a hinge in the axial direction.

SUMMARY OF THE INVENTION

In one aspect the invention consists in a hinge comprising two parts, a pin whereby said two parts are hinged together, an opening in one of said two parts, an end portion of said pin force fitted in said opening, a bearing surface on one of said two parts, and a head on said pin in stressed axial bearing engagement with said bearing surface.

In this context the term "force fitted" is intended to mean a fit whereby radial stresses are developed between the two parts engaged with each other.

Likewise, the term "stressed axial bearing engagement" is intended here to mean a bearing enagement whereby axial stresses are developed between the two parts in question.

In accordance with the invention the pin employed is subject to both radial stresses of this kind and axial stresses of this kind, the radial stresses being operative at one end and the axial stresses at the other end; experience shows that an arrangement of this kind is a sure and convenient way of securing the required axial retention.

As the hinge in accordance with the invention has the advantage of not comprising any screw there is no risk of untimely unscrewing during service.

In order to develop the required radial and axial stresses, the inherent characteristics of shape memory alloys are preferably exploited.

As is known, a shape memory alloy is an alloy which, reversibly and due to temperature changes alone, is able to undergo a structural transformation in the solid state between two separate phases, a so-called austenitic phase and a so-called martensitic phase, in each of which it can be given a respective different shape to which it spontaneously reverts at the corresponding temperature.

The pin of the hinge in accordance with the invention is therefore preferably fabricated from a shape memory alloy of this kind.

At low temperature, meaning at a temperature much lower than ambient temperature, the alloy is in the martensitic phase, for example, and the diameter of the pin is reduced whereas its length is increased.

This reduction in the diameter of the pin is exploited to enable insertion of its end portion into the opening in the part with which it is to be engaged.

At ambient temperature the shape memory alloy employed is in the austenitic phase and the diameter of the pin in accordance with the invention is increased whereas its length is reduced.

Its end portion is then locked into the opening in the part into which it is inserted while its head is brought into stressed bearing engagement with the corresponding bearing surface, whether this bearing surface is on the same part or on the other of the parts concerned.

Apart from the fact that an arrangement of this kind is particularly simple, in accordance with a further feature of the invention it makes it possible, where required, and in the case of application to an eyeglass frame, to adjust the capacity of the corresponding lateral support temple to open.

In accordance with this further feature, over part at least of its length between its end portion and its head the shank of the pin employed is eccentric relative to the end portion and the head.

It is then merely necessary to exploit the freedom of the pin to rotate relative to the opening in which its end portion is inserted, at the low temperature, in order to turn it through the required angle so that, the rotation axis of the lateral support temple concerned being moved in this way, this lateral support temple can open to a greater or lesser degree, the stub through which it bears against the front assembly being itself located nearer to or further away from the latter.

The characteristics and advantages of the invention will emerge from the following description given by way of example only and with reference to the appended schematic drawings.

DESCRIPTION OF THE PREFERRED EMBODIMENTS

Figure 1:
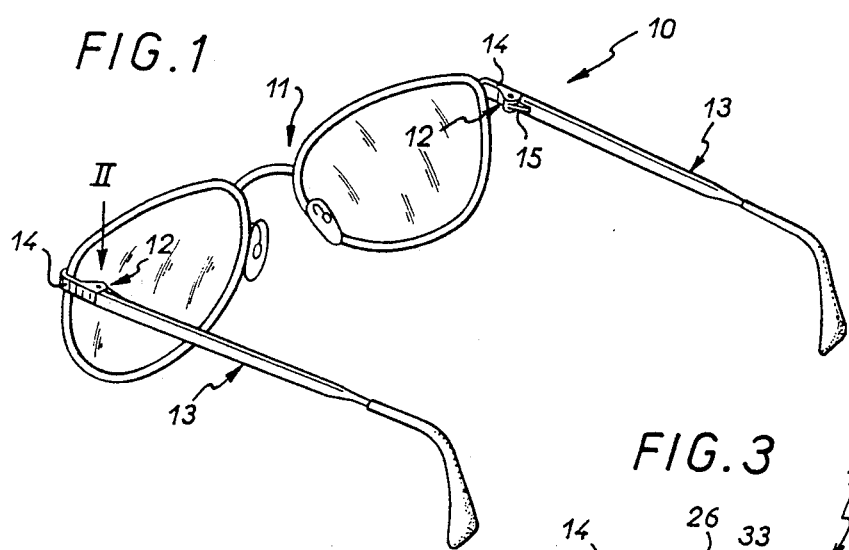
FIG. 1 is a perspective view of an eyeglass frame employing at least one hinge in accordance with the invention.
Figure 2:
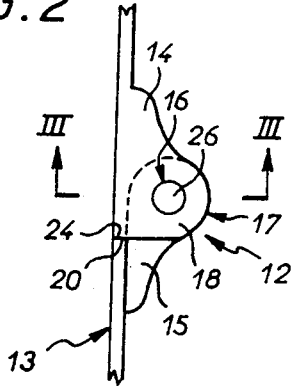
FIG. 2 is a plan view to a larger scale of a hinge of this kind as seen in the direction of the arrow II in FIG. 1.

The figures show by way of example the application of the invention to an eyeglass frame 10.

Taken as a whole, an eyeglass frame 10 of this kind comprises a front assembly 11 and two lateral support temples 13 each articulated to the front assembly a respective hinge 12.

Taken as a whole, each of the hinges 12 thus employed itself comprising two parts 14, 15 articulated to each other by a pin 16.

The part 14 is part of the front assembly 11.

It is usually a tenon appropriately attached to the latter, as by welding, for example, in the case of a metal front assembly.

Be this as it may, the part 14 in practise forms at its end a yoke 17 for the pin 16, between the two branches 18, 18' of which the pin 16 extends tranversely.

To this end each of the branches 18, 18' of the yoke 17 has a respective opening 19, 19'.

In the embodiment shown, in each of the branches 18, 18' the corresponding opening 19, 19' forms a bore, in practise having a circular transverse contour.

Also, the part 14 of a hinge 12 thus forming part of the front assembly 11 forms at its end, on the side opposite the yoke 17 relative to the pin 16, a transverse abutment surface 20 substantially parallel to the general plane of the front assembly 11, for reasons that will emerge hereinafter.

The part 15 of a hinge 12 conjointly forms part of the corresponding lateral support temple 13.

It may be a boss, for example, initially separate from the lateral support temple 13 and then appropriately attached to it, as by welding, for example, if the lateral support temple 13 is of metal.

Be this as it may, the part 15 forms a knuckle 22 for the pin 16 by virtue of which it is inserted between the two branches 18, 18' of the yoke 17 of the corresponding part 14.

Like these branches 18, 18', the knuckle 22 comprises to this end a bore 23, in practise having a circular transverse contour, and so itself also forms a lug.

The resulting part 15 is in practise attached laterally to the lateral support temple 13 to which it is fitted, projecting from the end thereof, on the inside surface of the lateral support temple 13, so that the end of the lateral support temple 13 forms a stub 24 adapted to cooperate bearing fashion with the abutment surface 20 on the corresponding part 14 of the front assembly 11.

In accordance with the invention, an end portion 25 of the pin 16 is force fitted into an opening in one of the parts 14, 15 concerned and, by means of a head 26 which is larger transversely than its shank 27, it is in stressed axial bearing engagement with a bearing surface forming part of one or the other of the parts 14, 15.

In the embodiment shown featuring the yoke 17 and knuckle 22, the end portion 25 of the pin 16 is inserted in the opening 19' in the branch 18' of the yoke 17.

The opening 19' in practise forms a bore in which the end portion 25 of the pin 16 is inserted.

In the embodiment specifically shown in FIGS. 1 through 4 the end portion 25 of the pin 16 is directly continuous with the shank 27, its outside surface extending that of the latter and the whole constituting a cylindrical shaft.

In this embodiment there is in practise clearance between the shank 27 and the bore 19 in the other branch 18 of the yoke 17 of the part 14.

In this embodiment the head 26 of the pin 16 bears on this other branch 18 of the yoke 17 of the part 14, the bearing surface 30 associated with it forming part of the surface 31 of said branch 18 which faces away from the previous branch 18', that is to say the outside surface of this branch 18.

To this end, the lower surface of the head of the pin 16 forms an annular flat transverse shoulder 33.

Be this as it may, in this embodiment the bearing surface 30 associated with the head 26 of the pin 16 is part of the same part as that providing the force fit engagement with the portion 25 of the pin 16.

Finally, in the embodiment shown in FIGS. 1 through 4 the shank 27 of the pin 16 is surrounded with a bearing pad 35 over at least that part of its length passing through the knuckle 22 of the part 15, between its end portion 25 and its head 16.

This pad 35 may be of bronze or a man-made material, for example.

The pin 16 is preferably made from shape memory alloy.

This may be an alloy of nickel and titanium, for example, or a copper-zinc-aluminum alloy.

Be this as it may, given the thermo-elastic behavior of an alloy of this kind it is possible to obtain a high capacity for elongation between two specific temperatures, usually in the order of 5 to 8%, and in all cases very much greater than the usual capacity for thermal expansion.

Figure 4A:
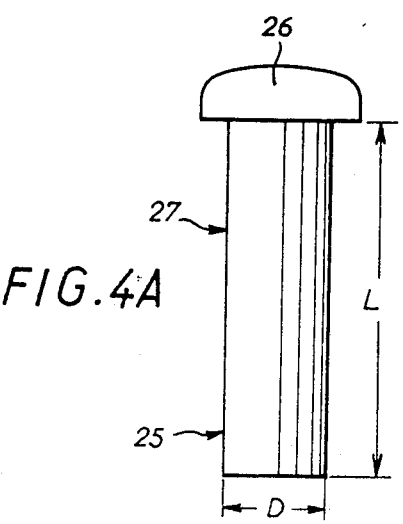
FIG. 4 is an elevation view to the same scale as FIG. 3 and showing the pin employed in a hinge of this kind in isolation and at ambient temperature.
FIG. 4B is a view analogous to that of FIG. 4A showing the pin at a lower temperature.
Figure 4B:
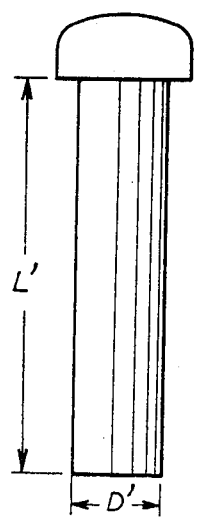

For example, if the total length of the shank 27 of the pin 16 and its end portion 25 at ambient temperature has a value L, then at a low temperature (for example, a temperature in the order of −60° C. to −80° C.) it has a value L′ which is significantly greater than the previous value (FIG. 4B).

Conjointly, if the conjoint diameter of the shank 27 and the end portion 25 has a value D at ambient temperature, then at low temperature it has a value D′ significantly lower than the previous value.

In FIGS. 4A, 4B the relative differences between the dimensions concerned have been deliberately exaggerated.

The designed diameter D1 of the bore constituting the opening 19' in the branch 18' of the yoke 17 of the part 14 has a value lying between D and D′ at ambient temperature.

To fit it the pin 16 is cooled to a temperature between −60° C. and −80° C., for example by a jet of air appropriately cooled and appropriately directed by any form of blower nozzle.

Cooled in this way, after being passed through the branch 18 of the yoke 17 of the part 14, on the one hand, and the knuckle 22 on the part 15, to be more precise the bearing pad 35 associated with the latter, on the other hand, the end portion 25 of the pin 16 is inserted into the bore constituting the opening 19′ in the other branch 18′ of said yoke 17, this insertion being continued until the transverse shoulder 33 of the head 26 butts up against the bearing surface 30 that is associated with it, that is to say against the outside surface of the branch 18 of the yoke 17.

As will be readily understood this insertion is facilitated by the fact that at low temperature the diameter D′ of the end portion 25 of the pin 16 is less than that D1 of the bore constituting the opening 19′ in the branch 18′ of the yoke 17.

Once the pin 16 has been inserted in this way it is returned to ambient temperature. Its end portion 25 then resumes its initial configuration whereby it is pressed strongly against the inside wall of the bore constituting the opening 19′ in the branch 18′ of the yoke 17, with radial stresses developed between these parts, as schematically represented by the arrows F1 in FIG. 3.

Further, the combination of this force fit of the end portion 25 with the opening 19′ and the stressed axial hearing engagement of the head of the pin with the bearing surface define means for maintaining the two parts 14 and 15 in axially spaced relation with one another along the axis of the pin 16.

This results in the force fit in accordance with the invention.

Figure 3:
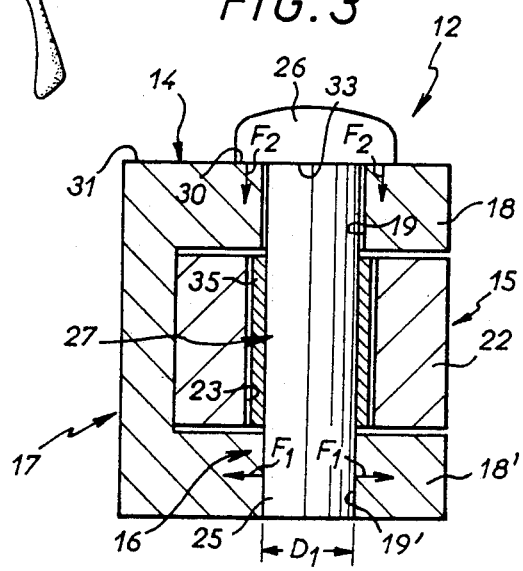
FIG. 3 is a view in transverse cross-section on the line III—III in FIG. 2, to a larger scale.

Because the end portion 25 of the pin 16 is strongly gripped in the branch 18′ of the yoke 17 of the part 14 while its head 16 is in axial bearing engagement against the other branch 18 of the latter, there are developed between the head 26 and this branch 18 of the yoke 17 axial stresses, that is to say stresses parallel to the axis of the assembly, since the shank 27 also reverts to its initial configuration, and as schematically represented by the arrows F2 in FIG. 3.

This results in the stressed axial bearing engagement in accordance with the invention.

The combination of this force fit and this stressed axial bearing engagement advantageously procures reliable and secure retention of the pin 16.

A further advantageous result is the taking up of any clearance between the part 14 and the part 15, and thus a possible braking action on the lateral support temple 13 concerned for movement about its articulation axis.

Figure 5:
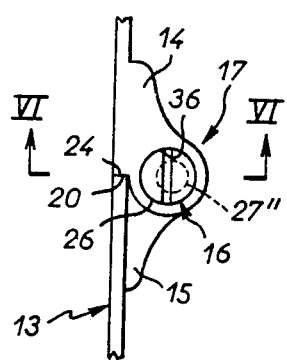
FIGS. 5 and 6 are respectively views analogous to those of FIGS. 2 and 3 and relate to an alternative embodiment.
Figure 7:
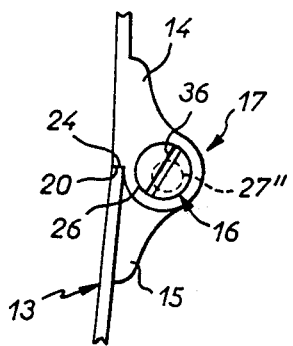
FIG. 7 is a plan view analogous to that of FIG. 5 showing the cam adjustment method employed in this embodiment.
Figure 6:
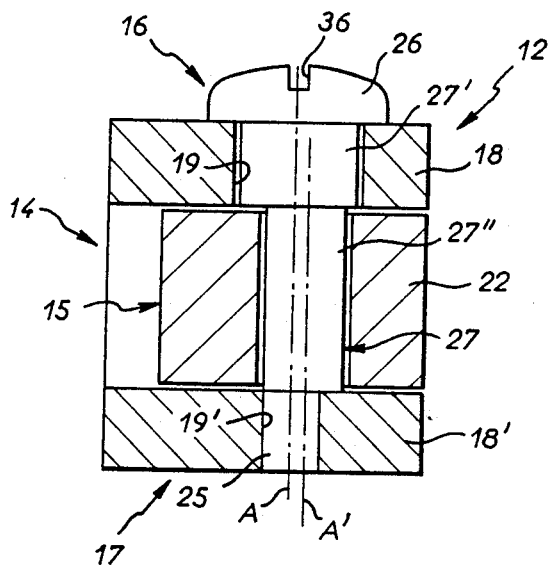

In the embodiment shown in FIGS. 5 through 7 the shank 27 of the pin 16 is eccentric between the end portion 25 and the head 26 relative to the end portion 25 and the head 26, over at least part of its length corresponding to the knuckle 22 of the part 15.

In this embodiment the shank 27 in practise comprises, starting from the head 26, a first portion 27′ which is coaxial with the end portion 25, although it is of greater diameter than the latter, and the height of which corresponds to that of the branch 18 of the yoke 17 of the part 14, and a second portion 27″ the height of which corresponds to that of the knuckle 22 of the part 15 and which is eccentric to the end portion 25 and the previously mentioned portion 27′, the axis A′ of this portion 27″ being therefore offset laterally relative to the overall axis A of the pin 16, that is to say relative to the axis common to its end portion 25, the portion 27′ of its shank 27 and its head 26.

Also, the head 26 of the pin 16 conjointly features a diametral slot 36 like a screw head.

During the insertion of the pin 16 at low temperature, and given the capacity at this time for its end portion 25 to rotate relative to the bore constituting the corresponding opening 19′ in the branch 18′ of the yoke 17, it can be pivoted about its axis A, by operating on its head 26, so as to adjust the position of the knuckle 22 of the part 15 relative to the yoke 17, by means of the cam that the portion 27″ of its shank 27 constitutes, so adjusting the position of the corresponding lateral support temple 13 relative to the front assembly 11.

Because of this, the articulation axis of the lateral support temple 13 may be moved away from the front assembly 11, for example.

Consequently, as shown in FIG. 7, its capacity for opening is increased, as a greater angle of rotation has to be imposed on it before its stub 24 butts up against the bearing surface 20 on the part 14 of the corresponding front assembly 11.

Figure 8:
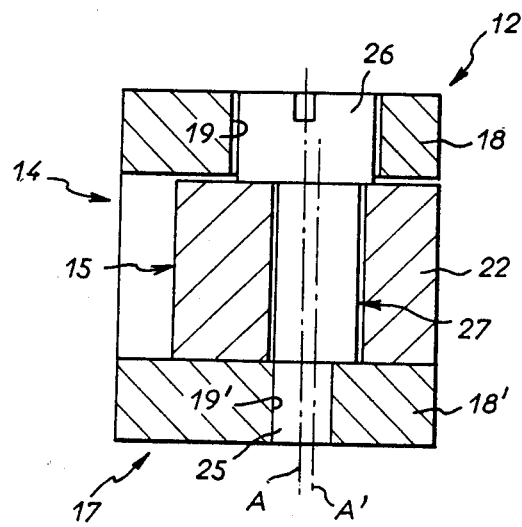
FIG. 8 is a view in transverse cross-section analogous to that of FIG. 6 relating to a further embodiment.

In the embodiment shown in FIG. 8 the head 26 of the pin 16 is recessed into the branch 18 of the yoke 17 of the part 14 by means of the bore 19 in the latter.

Thus the bearing surface 30 associated with it is not part of the part 14, but rather of the part 15, that is to say of the other of the parts 14, 15 than that in which its end portion 25 is force fitted.

Thus in practise it forms part of the surface of the knuckle 22 of the part 15 opposite the branch 18′ of the yoke 17 of the part 14, that in which the end portion 25 of the pin 16 is force fitted.

This embodiment results in more intense braking of rotation of the lateral support temple 13 about its articulation axis.

It is to be understood that the present invention is not limited to the embodiments described and shown but encompasses any variant execution and/or combination of their various component parts.

I claim:

1. Hinge comprising two parts having respective openings in registration, a hinge pin of shape memory alloy received in said openings, said hinge pin having a cylindrical portion, one of said openings in one of said parts being of cylindrical configuration complementary to that of a portion of said hinge pin, said hinge pin portion and said one opening being in a force fit relationship, means maintaining said parts in predetermined axial relationship along the axis of the hinge pin, said hinge pin portion being an end portion of said pin axially remote from a head portion of said hinge pin, a bearing surface being provided on one of said parts, said head portion being in axially stressed engagement with said bearing surface, and said pin comprising over at least part of its length between said end portion and said head portion a portion that is eccentric relative to said end portion and said head portion for adjusting the transverse position of said knuckle relative to said yoke.

2. Hinge according to claim 1, wherein said bearing surface and said one opening are respectively on and in the same one of said two parts.

3. Hinge according to claim 2, wherein one of said two parts is a yoke comprising two branches, the other of said two parts comprises a knuckle inserted between said branches, said end portion of said pin is engaged in said one opening in one of said branches of said yoke and said head bears on the other of said branches, the associated bearing surface forming part of a surface of said other branch that faces away from said one branch, said means maintaining said parts in predetermined axial relationship being defined by said yoke and knuckle.

4. Hinge according to claim 1, wherein said bearing surface and said one opening are respectively on and in different ones of said two parts.

5. Hinge according to claim 4, wherein one of said two parts is a yoke comprising two branches, the other of said two parts comprises a knuckle inserted between said branches, said end portion of said pin is engaged in said one opening in one of said branches of said yoke and said head bears on said knuckle, the associated bearing surface forming part of a surface of said knuckle that faces away from said branch of said yoke, said means maintaining said parts in predetermined axial relationship being defined by said yoke and knuckle.

6. Hinge according to claim 1, wherein said one opening constitutes a bore receiving said end portion of said pin.

7. Hinge according to claim 1, wherein said one opening is in a first of said parts and said bearing surface is on a second one of said parts, said hinge pin applying said second part against said first part so as to impede relative movement of said parts.

8. Hinge comprising two parts having respective openings in registration, a hinge pin of shape memory alloy received in said openings, said hinge pin having a cylindrical portion, one of said openings in one of said parts being of cylindrical configuration complementary to that of a portion of said hinge pin, said hinge pin portion and said one opening being in a force fit relationship, means maintaining said parts in predetermined axial relationship along the axis of the hinge pin, and a bearing pad around said pin between said end portion and said head portion.

9. Eyeglass frame including a frame face and temple supports, a hinge hingedly connecting the frame face to one of the temple supports, said hinge comprising two parts having respective openings in registration, a hinge pin of shape memory alloy received in said openings, said hinge pin having a cylindrical portion, one of said openings in one of said parts being of cylindrical configuration complementary to that of a portion of said hinge pin, said hinge pin portion and said one opening being in a force fit relationship, means maintaining said parts in axially spaced relationship along the axis of the hinge pin, said hinge pin portion being an end portion of said pin axially remote from a head portion of said hinge pin, a bearing surface being provided on one of said parts, said head portion being in axially stressed engagement with said bearing surface, and said pin comprising over at least part of its length between said end portion and said head portion a portion that is eccentric relative to said end portion and said head portion, for adjusting the transverse position of said knuckle relative to said yoke.

10. Eyeglass frame according to claim 9, wherein said bearing surface and said opening are respectively on and in the same one of said two parts.

11. Eyeglass frame according to claim 10, wherein one of said two parts is a yoke comprising two branches, the other of said two parts comprises a knuckle inserted between said branches, said end portion of said pin is engaged in said one opening in one of said branches of said yoke and said head bears on the other of said branches, the associated bearing surface forming part of a surface of said other branch that faces away from said one branch, said means maintaining said parts in predetermined axial relationship being defined by said yoke and knuckle.

12. Eyeglass frame according to claim 9, wherein said bearing surface and said one opening are respectively on and in different ones of said two parts.

13. Eyeglass frame according to claim 12, wherein one of said two parts is a yoke comprising two branches, the other of said two parts comprises a knuckle inserted between said branches, said end portion of said pin is engaged in said one opening in one of said branches of said yoke and said head bears on said knuckle, the associated bearing surface forming part of a surface of said knuckle that faces away from said branch of said yoke.

14. Eyeglass frame according to claim 9, wherein said one opening is in a first of said parts and said bearing surface is on a second one of said parts, said hinge pin applying said second part against said first part so as to impede relative movement of said parts.

15. Eyeglass frame including a frame face and temple supports, a hinge hingedly connecting the frame face to one of the temple supports, said hinge comprising two parts having respective openings in registration, a hinge pin of shape memory alloy received in said openings, said hinge pin having a cylindrical portion, one of said openings in one of said parts being of cylincrical configuration complementary to that of a portion of said hinge pin, said hinge pin portion and said one opening being in a force fit relationship, means maintaining said parts in axially spaced relationship along the axis of the hinge pin, and a bearing pad around said pin between said end portion and said head portion.

16. Eyeglass frame according to claim 15, wherein said one opening constitutes a bore receiving said end portion of said pin.

17. Eyeglass frame according to claim 15, wherein said hinge pin portion is an end portion of said pin axially remote from a head portion of said hinge pin, a bearing surface being provided on one of said parts, said head portion being in axially stressed engagement with said bearing surface.

18. Eyeglass frame comprising a front assembly, two lateral support temples, at least one hinge for hinging said front assembly to a corresponding one of said temples, said hinge comprising two parts having respective openings in registration, a hinge pin of shape memory alloy received in said openings, said hinge pin having a cylindrical portion, one of said openings in one of said parts being of cylindrical configuration complementary to that of a portion of said hinge pin, said hinge pin portion and said one opening being in a force fit relationship, means maintaining said parts in predetermined axial relationship along the axis of the hinge pin, said hinge pin portion being an end portion of said pin axially remote from a head portion of said hinge pin, a bearing surface being provided on one of said parts, said head being in axial stressed engagement with said bearing surface, and said pin comprising over at least part of its length between said end portion and said head portion a portion that is eccentric relative to said end portion and said head portion, for adjusting the transverse position of said knuckle relative to said yoke.

19. Eyeglass frame according to claim 18, wherein said bearing surface and said one opening are respectively on and in different ones of said two parts.

20. Eyeglass frame according to claim 19, wherein one of said two parts is a yoke comprising two branches, the other of said two parts comprises a knuckle inserted between said branches, said end portion of said pin is engaged in said one opening in one of said branches of said yoke and said head bears on said knuckle, the associated bearing surface forming part of a surface of said knuckle that faces away from said branch of said yoke, said means maintaining said parts in predetermined axial relationship being defined by said yoke and knuckle.

21. Eyeglass frame according to claim 18, wherein said opening constitutes a bore receiving said end portion of said pin.

22. Eyeglass frame according to claim 18, wherein said one opening is in a first of said parts and said bearing surface is on a second one of said parts, said hinge pin applying said second part against said first part so as to impede relative movement of said parts.

23. Eyeglass frame comprising a front assembly, two lateral support temples, at least one hinge for hinging said front assembly to a corresponding one of said temples, said hinge comprising two parts having respective openings in registration, a hinge pin of shape memory alloy received in said openings, said hinge pin having a cylindrical portion, one of said openings in one of said parts being of cylindrical configuration complementary to that of a portion of said hinge pin, said hinge pin portion and said one opening being in a force fit relationship, means maintaining said parts in predetermined axial relationship along the axis of the hinge pin, and a bearing pad around said pin between said end portion and said head portion.

24. Eyeglass frame according to claim 23, wherein said bearing surface and said one opening are respectively on and in the same one of said two parts.

25. Eyeglass frame according to claim 24, wherein one of said two parts is a yoke comprising two branches, the other of said two parts comprises a knuckle inserted between said branches, said end portion of said pin is engaged in said one opening in one of said branches of said yoke and said head bears on the other of said branches, the associated bearing surface forming part of a surface of said other branch that faces away from said one branch, said means maintaining said parts in predetermined axial relationship being defined by said yoke and knuckle.

26. Eyeglass frame according to claim 23, wherein said hinge pin portion is an end portion of said pin axially remote from a head portion of said hinge pin, a bearing surface being provided on one of said parts, said head being in axial stressed engagement with said bearing surface.

* * * * *